United States Patent [19]

Thomas

[11] Patent Number: 4,537,363
[45] Date of Patent: Aug. 27, 1985

[54] LOCK-UP MECHANISM FOR A VEHICLE SENSITIVE AUTOMOTIVE SEAT BELT RETRACTOR

[75] Inventor: Rudy V. Thomas, Sterling Heights, Mich.

[73] Assignee: Allied Corporation, Morris Township, Morris County, N.J.

[21] Appl. No.: 646,394

[22] Filed: Aug. 30, 1984

[51] Int. Cl.³ .................... A62B 35/02; B65H 75/48
[52] U.S. Cl. ............................................. 242/107.4 A
[58] Field of Search .................. 242/107.4 R–107.4 E, 242/107.6, 107.7; 280/806; 297/478

[56] References Cited
U.S. PATENT DOCUMENTS 4,428,545  1/1984  Naitoh ..................... 242/107.4 R X
4,436,255  3/1984  Matsui et al. ................ 242/107.4 A Primary Examiner—John M. Jillions
Attorney, Agent, or Firm—James R. Ignatowski

[57] ABSTRACT

A lock-up mechanism for a vehicle sensitive automotive seat belt retractor having a shuttle displaceable with the winding and unwinding of the seat belt webbing from the retractor's spool and a lock pawl activated by the shuttle to pivot the retractor's lock bar into engagement with the retractor's lock bar. The lock pawl is pivoted to a reset position by the shuttle disengaging the lock pawl from the retractor's lock bar permitting the webbing to be extracted from the retractor's spool in a normal manner. An overcenter spring holds the lock pawl in either the locked position pivoting the lock bar into engagement with the retractor's ratchet wheel or the reset position with the lock pawl disengaged from the lock bar.

17 Claims, 5 Drawing Figures

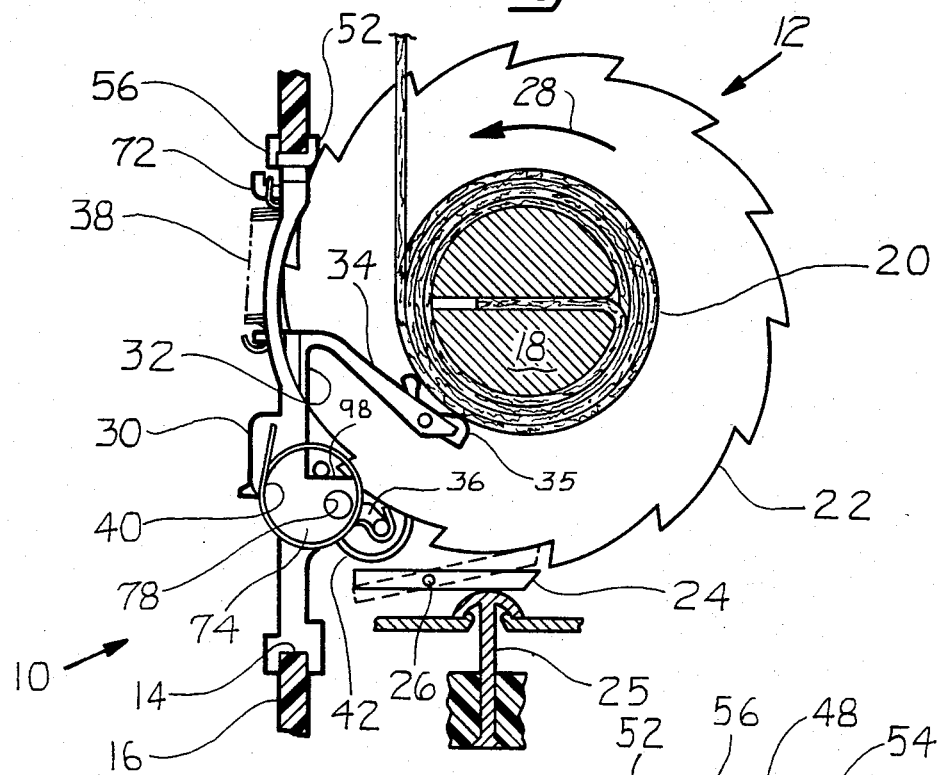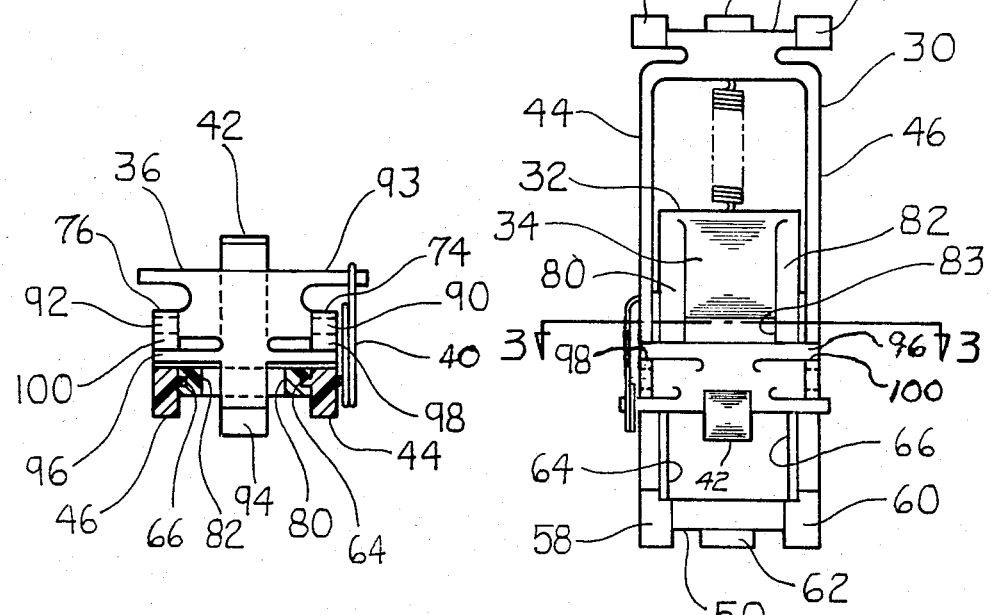

LOCK-UP MECHANISM FOR A VEHICLE SENSITIVE AUTOMOTIVE SEAT BELT RETRACTOR

BACKGROUND OF THE INVENTION

1. Field of the Invention

The invention is related to vehicle sensitive seat belt retractors and in particular to a lock-up mechanism for vehicle sensitive seat belt retractors for locking a child's seat in place.

2. Prior Art

Vehicle sensitive seat belt retractors have gained wide acceptance for automotive use since they provide a greater degree of freedom for the passengers than the conventional types of seat belt retractors which lock up once the seat belt is buckled and the excess webbing retracted by the retractor. In a vehicle sensitive seat belt retractor, the retractor does not lock up, and will allow the seat belt webbing to be extracted with the movement of the buckled passenger. This flexibility allows the passenger a greater degree of freedom to move without being restrained by the seat belt. The vehicle sensitive seat belt retractors normally include an inertia sensor responsive to a sudden change in the vehicle's velocity, such as a crash condition, which automatically locks up the retractor such that the webbing can no longer be extracted, thereby securing the passenger in place.

However, with the recent enactment of laws which require child seats for small children below a predetermined age, the vehicle sensitive retractor systems are inadequate for holding the child's seat in place in the absence of a crash condition. The normal activity of the child is capable of causing the child's seat to be displaced from its desired position resulting in excessive slack in the seat belt. This displacement of the child's seat results in inadequate protection for the child which is contra to the intent of these laws.

The invention is a lock-up mechanism for the vehicle sensitive retractors, which locks the child's seat in place once the seat belt is fastened to the child's seat. This lock-up mechanism is an improvement over the operator actuated lock-up mechanism disclosed by J. W. Frankila and R. L. Stephenson in U.S. Pat. No. 4,327,882.

SUMMARY OF THE INVENTION

The invention is a lock-up mechanism for a vehicle sensitive seat belt retractor of the type having a base plate, a spool rotatably mounted to the base plate, a length of seat belt webbing wound on the spool, a spring motor for retracting the seat belt webbing on the spool, a ratchet wheel attached to the spool, a lock bar pivotally attached to the base plate, and an inertia sensor for pivoting the lock bar to engage the ratchet wheel in response to the inertial forces of a crash condition, the lock-up mechanism characterized by a frame adapted to be connected to the base plate adjacent to the spool, a shuttle slidably disposed in the frame, said shuttle movably displaced between a first position when the webbing is unwound from the spool and a second position when the webbing is wound on the spool, and lock pawl means pivotally attached to the frame, the lock pawl means displaceable between a locked position pivoting the lock bar to engage the ratchet wheel in response to the shuttle being in the first position and a reset position disengaged from the lock bar in response to the shuttle being in the second position.

The advantage of the lock-up mechanism is that it converts a vehicle sensitive seat belt retractor to a locking retractor without modification of the retractor itself. Another advantage of the lock-up mechanism is that it can be snapped in place without the use of any tools. Still another advantage is that it prevents the unwinding of the webbing from the spool rendering a vehicle sensitive seat belt retractor capable of holding a child's seat in place. These and other advantages will become more apparent from reading the specification in conjunction with the figures.

BRIEF DESCRIPTION OF THE DRAWINGS

FIG. 1 is a partial cross-section of a vehicle sensitive seat belt retractor showing the lick-up mechanism installed.

FIG. 2 is a plan view of the lock-up mechanism.

FIG. 3 is a transverse cross-section of the lock-up mechanism.

DETAILED DESCRIPTION OF THE INVENTION

Figure 4:
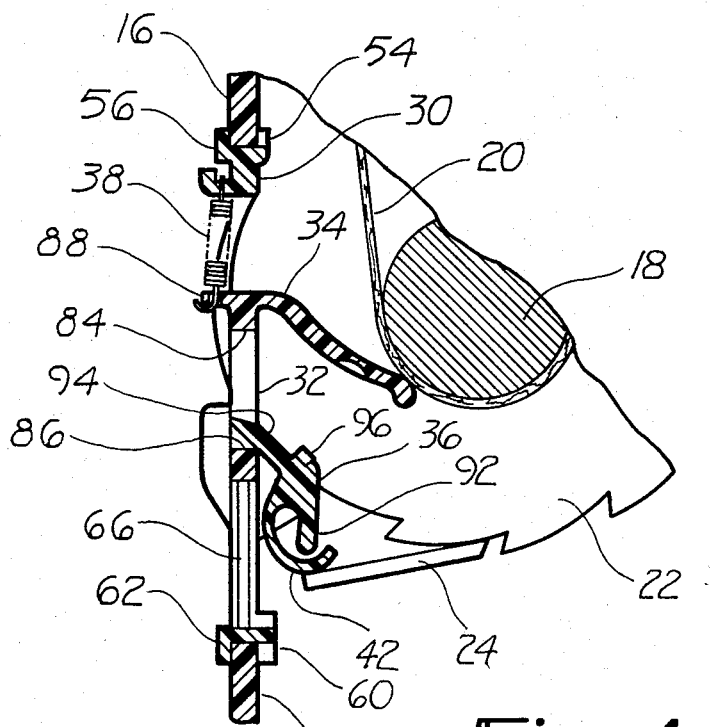
FIG. 4 is a longitudinal cross-section of the lock-up mechanism with the lock pawl in the locked position.

Referring to FIG. 1, the child seat lock-up mechanism 10 is shown mounted on a typical vehicle sensitive seat belt retractor assembly 12. For clarity, only the parts of the retractor assembly 12 which interact with the lock-up mechanism 10 are shown. In particular, the lock-up mechanism 10 is mounted in an aperture 14 provided in the base plate 16 of the retractor assembly 12 adjacent to the spool 18 on which the seat belt webbing 20 is wound. Attached to the spool is at least one ratchet wheel 22 which is engageable by a lock bar 24 to prevent retraction of the webbing 20 from the spool 18 in the event of a crash condition. As is known in the art, the lock bar 24 is normally disengaged from the ratchet wheel 22, and is pivotal about a pivot axis 26 to an engaged position (shown in phantom) by an inertia sensor 25 in response to a crash condition. The lock bar 24 may be held in the disengaged position by gravity or may be spring loaded when the retractor is mounted in a position other than the verticle position shown. The retractor assembly 12 also includes a spring motor (not shown) producing a rotary force biasing the spool 18 and ratchet wheel 22 in a direction, indicated by arrow 28, tending to wind the seat belt webbing 20 on the spool.

The child seat lock-up mechanism 10 comprises a hollow frame 30, a shuttle 32 having a web follower 34 slidably disposed in the frame 30, and a pawl 36 pivotally supported from the frame 30. A coil spring 38 connected between the frame 30 and shuttle 32 biases the shuttle 32 so that the web follower engages the webbing 20 on spool 18. The winding and unwinding of the webbing 20 on spool 18 will cause the shuttle 32 to be longitudinally displaced with respect to the frame 30. An overcenter spring 40 is connected between the frame 30 and the lock pawl 36 and produces a force maintaining the lock pawl in either a locked or reset position. As more clearly shown in FIG. 4, the pawl 36 has a resilient arcuate contact member 42 which in the locked position of the lock pawl 36 engages the lock bar 24 causing the lock bar to pivot about its pivotal axis 26 and engage the teeth of the ratchet wheel 22. In the reset position of the lock pawl 36, as shown in FIG. 5, the contact member 42 is displaced away from the lock bar 24 which permits the lock bar 24 to assume its normal disengaged position.

The details of the lock-up mechanism will now be described with reference to FIGS. 2 through 5. The frame 30 comprises two longitudinal support members 44 and 46 supported in parallel relationship by a pair of transverse cross members 48 and 50. The cross member 48 has a pair of outboard tabs 52 and 54 and a central tab 56 which straddle the retractor assembly's base plate 16 at the top of aperture 14 and secure the top part of the frame 30 to the retractor assembly 12. In a like manner cross member 50 has a pair of outboard tabs 58 and 60 and a central tab 62 which straddle the base plate 16 at the opposite end of aperture 14 and secure the bottom part of frame 30 to the retractor assembly 12. The tabs 52 through 62 permit the lock-up mechanism to be snapped into the aperture 14 provided in the base plate 16 of the retractor assembly 12 without the use of tools or disassembly of the retractor.

The longitudinal support members 44 and 46 each have an inboard tongue 64 and 66 respectively, which are slidably received in a pair of grooves provided in the shuttle 32 as more clearly shown in FIG. 3. This tongue and groove arrangement permits the shuttle 32 to be slidably displaced with reference to the frame 30 as the web follower 34 is displaced by the winding and unwinding of the seat belt webbing 20 on spool 18. A compensator pawl 35 may be pivotally attached to the end of the web follower 34, as shown on FIG. 1. The function of the compensator pawl 35 is to compensate for variations in the thickness of the webbing 20 wound on spool 18 where the second and subsequent winding of the webbing 20 overlap the beginning of the first winding. The compensator pawl 35 eliminates the false tripping of pawl 36 due to a bump or hole on the webbing 20 wound on spool 18.

The frame 30 also has a hook 72 integral with cross member 48 for receiving one end of coil spring 38 and a pair of bosses 74 and 76 protruding inwardly from the longitudinal frame members 44 and 46 respectively. Each boss has an aperture 78 for pivotally receiving the lock pawl 36.

Figure 5:
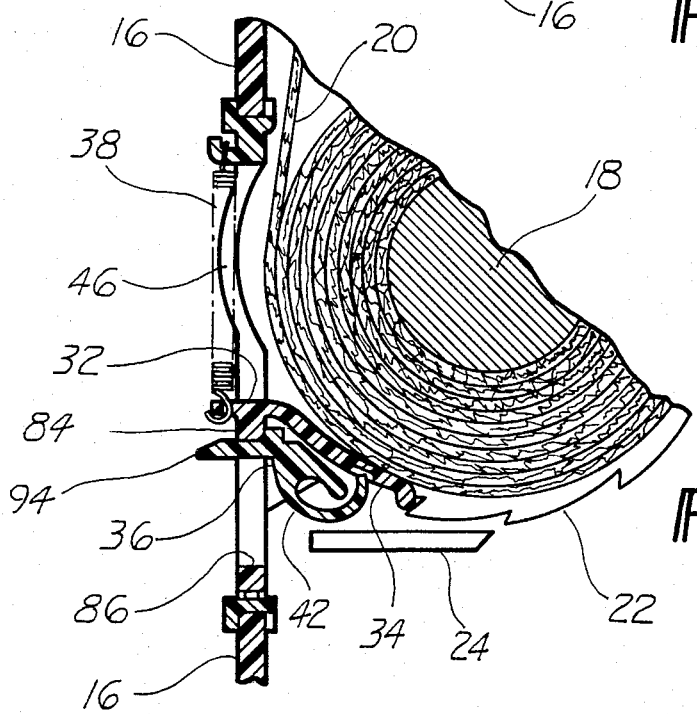
FIG. 5 is a longitudinal cross-section of the lock-up mechanism with the lock pawl in the reset position.

The shuttle 32 has a pair of spatially separated longitudinal guide members 80 and 82 connected by a pair of integral cross members 84 and 86 as more clearly shown in FIGS. 4 and 5. The guide members 80 and 82 along with cross members 84 and 86 form a rectangular aperture 83 therebetween. The guide members 80 and 82 are grooved to receive the tongues 64 and 66 of the frame's support members as previously described. The cross member 84 is formed integral with the web follower 34 and includes a spring hook 88 receiving the other end of coil spring 38. In FIGS. 2, 3, 4 and 5, the compensator pawl 35 is not shown to simplify the drawings.

The lock pawl 36 has a central shaft portion having a pair of pivot posts 90 and 92 at its opposite ends received in the apertures 78 of the frame 30. Formed integral with the shaft portion is a spring attachment bar 93 to which one end of the overcenter spring 40 is connected, pawl actuator 94, the resilient contact member 42 and a stop bar 96 which abuts the flat surface 98 and 100 of the bosses 74 and 76 respectively to limit the pivotal displacement of lock pawl 36. As more clearly shown on FIGS. 4 and 5 the pawl actuator 94 extends into the shuttle's rectangular aperture 83 between the cross members 84 and 86. When the webbing is fully extracted from the retractor assembly 12, as illustrated on FIG. 4, the shuttle 32 moves upwardly causing the cross member 86 to engage the pawl actuator 94 and rotate the lock pawl 36 in a clockwise direction to its locked position with the contact arm 42 pivoting the lock bar 24 into engagement with the ratchet wheel 22. The overcenter spring 40 will hold the lock pawl 36 in this position until it is displaced to its reset position by cross member 84 at the other end of the shuttle's rectangular aperture 83 when the webbing is fully retracted on the spool 18 as shown in FIG. 5.

When the lock pawl 36 is in the locked position, the spool 18 may be rotated by the spring motor in only the direction indicated by arrow 28 to retract the webbing 20 onto the spool 18. The resilient arcuate contact member 42 will permit the lock bar 24 to be pivotally displaced allowing the passage of the teeth on the ratchet wheel 22. This permits the webbing 20 to be retracted onto spool 18. With the lock pawl in the locked position, the lock bar 24 engages the teeth in the ratchet wheel 22 inhibiting the extraction of the webbing 20 from the retractor assembly 12.

When the webbing 20 is fully retracted on the spool 18 as shown in FIG. 5, the cross member 84 engages the pawl actuator 94 and rotates it in a counterclockwise direction to the reset position. The overcenter spring 40 will hold the pawl 36 in the reset position until it is displaced back to the locked position by cross member 86 in response to fully extracting the webbing 20 from the retractor assembly 12 as shown on FIG. 4.

In the reset position of lock pawl 36, the contact member 42 is disengaged from the lock bar 24 which assumes its normal disengaged position, allowing the webbing 20 to be freely extracted from the retractor assembly.

The operation of the child seat lock-up mechanism 10 is as follows: When it is desired to mount a child's seat in the vehicle, the seat belt webbing is fully extracted from the retractor, which sets the lock pawl 36 to the locked position. The seat belt is then attached to the child's seat and buckled in place. The spring motor will then retract the surplus portion of the webbing 20 securing the child's seat in the buckled position. With the lock pawl 36 in the locked position, the lock bar 24 is pivoted to engage the ratchet wheel 22 preventing any further extraction of the webbing 20 from retractor assembly 12. This locks the child's seat firmly in place and any subsequent wiggling or movement of the child will not loosen the seat belt securing the child's seat.

To release the child's seat, the seat belt is simply unbuckled and detached from the child'seat. When the seat belt is released, the spring motor will rewind the seat belt webbing 20 on the spool 18 causing the shuttle 32 to be displaced downward until the cross member 86 engages the pawl actuator 94 and pivots the lock pawl 32 to its reset position. In the reset position the seat belt webbing may be freely extracted as previously described.

The advantage of the child's seat lock-up mechanism is that, once the child's seat is buckled in place, it cannot be moved until the seat belt is unbuckled. Another advantage is that a conventional vehicle sensitive seat belt retractor may be simply modified to provide the child's seat lock-up capabilities by merely inserting the lock-up mechanism on the retractor which simply snaps in place and does not require any tools or disassembly of the seat belt retractor. Another advantage is that the lock-up mechanism does not impair the normal operation of the seat belt which may be used in its normal manner.

It is not intended that the invention be limited to the specific embodiment illustrated in the drawings and discussed in the specification. It is recognized that those skilled in the art will be able to make changes without departing from the spirit of the invention as set forth in the appended claims.

I claim:

1. A lock-up mechanism for an automotive vehicle sensitive seat belt retractor of the type having a base plate, a spool rotatably attached to the base plate, a length of seat belt webbing attached to the spool, a spring motor for winding the seat belt webbing on the spool, a ratchet wheel attached to the spool and rotatable therewith, a lock bar pivotally attached to the base plate adjacent to the ratchet wheel, and an inertia sensor for pivoting said lock bar to engage the ratchet wheel in response to the inertial forces of a vehicular crash, the lock-up mechanism comprising
   a frame adapted to be connected to the base plate of the retractor adjacent to the spool;
   a shuttle having a web follower, said shuttle slidably disposed in said frame and movable between a first and second position in response to the winding and unwinding of the seat belt webbing on the spool;
   resilient means for biasing said shuttle in a direction causing said web follower to engage the seat belt webbing wound on the spool;
   a lock pawl having a resilient contact member, said lock pawl pivotally attached to said frame and displacable between a lock and reset position by said shuttle being displaced to said first and second positions respectively, said contact member pivoting the lock bar into engagement with the ratchet wheel when said lock pawl is in said lock position and disengaged from the lock bar when said lock pawl is in said reset position; and
   an overcenter spring connected between said frame and said lock pawl producing a force biasing said pawl in said locked or reset positions when said shuttle is intermediate said first and second positions.

2. The lock-up mechanisms of claim 1 wherein said shuttle has a pair of longitudinal grooves on either side thereof and said frame has a pair of parallel support members on either side of said shuttle, each of said support member having a tongue slidably received in one of said longitudinal grooves.

3. The lock-up mechanism of claim 2 wherein said resilient means is a coil spring connected between said frame and said shuttle.

4. The lock-up mechanism of claim 1 wherein said lock pawl has an actuator arm and said shuttle includes means for engaging said actuator arm at said first and second positions to pivot said lock pawl between said lock and reset positions respectively.

5. The lock-up mechanism of claim 4 wherein said means for engaging the pawl's actuator arm is a rectangular aperture provided in said shuttle, and said pawl's actuator arm extends into said rectangular aperture and engages the opposite ends of said rectangular aperture when said shuttle is in said first and second positions.

6. The lock-up mechanism of claim 5 wherein said resilient contact member is an arcuate segment extending from said pawl towards the lock bar.

7. The lock-up mechanism of claim 1 wherein said web follower has a compensator pawl pivotally disposed at the end thereof, said compensator pawl engaging said webbing to compensate for bumps and holes in the webbing wound on the spool.

8. A lock-up mechanism for vehicle sensitive seat belt retractor having a base plate, a spool rotatably attached to the base plate, a length of seat belt webbing wound on said spool, a spring motor for retracting the seat belt webbing on the spool, a ratchet wheel attached to the spool and rotatable therewith, a lock bar pivotally attached to the base plate adjacent to the ratchet wheel, and an inertia sensor for pivoting the lock bar to engage the ratchet wheel to prevent unwinding of the webbing from the spool in response to the inertial forces of a vehicular crash, the lock-up mechanism characterized by:
   a frame adapted to be connected to the base plate adjacent to the spool;
   a shuttle slidably disposed in said frame, said shuttle movably displaced between a first position when the webbing is unwound from the spool and a second position when the webbing is wound on the spool; and
   lock pawl means pivotally attached to said frame, said lock pawl means displaceable between a locked position pivoting the lock bar to engage the ratchet wheel in response to said shuttle being displaced to said first position, and a reset position disengaged from said lock bar in response to said shuttle being displaced to said second position.

9. The lock-up mechanism of claim 8 wherein said shuttle has a webbing follower engaging the webbing wound on the spool and a resilient member connected between said frame and said shuttle producing a force biasing said webbing follower into engagement with the webbing wound on the spool.

10. The lock-up mechanism of claim 9 wherein said shuttle and frame are slidably connected by a longitudinal tongue and groove arrangement.

11. The lock-up mechanism of claim 10 wherein said shuttle has a pair of longitudinal grooves provided along the sides thereof and said frame has a pair of longitudinal members straddling the shuttle, each of said longitudinal members having a tongue slidably received in one of said grooves.

12. The lock-up mechanism of claim 8 wherein said lock pawl includes an overcenter spring producing a force biasing said lock pawl to either said lock or reset positions when said shuttle is intermediate said first and second positions.

13. The lock-up mechanism of claim 12 wherein said lock pawl has an actuator arm and said shuttle has means for engaging said actuator arm to pivot said lock pawl to said lock and reset positions when said shuttle is in said first and second positions respectively.

14. The lock-up mechanism of claim 13 wherein said means for engaging said actuator arm is a rectangular aperture provided in said shuttle and wherein said actuator arm extends into said rectangular aperture, said actuator arm engaging the transverse edge of said rectangular aperture to pivot said lock pawl between said locked and reset positions when said shuttle is in said first and second positions respectively.

15. The lock-up mechanism of claim 14 wherein said lock pawl has a resilient contact member engaging the lock bar when said lock pawl is in said locked position.

16. The lock-up mechanism of claim 15 wherein said resilient contact member is an arcuate segment extending from said pawl towards said lock bar.

17. The lock-up mechanism of claim 15 having a compensation pawl pivotally connected to the end of said webbing follower, said compensation pawl engaging said webbing and reducing the variations in the displacement of said shuttle due to bumps and holes of the webbing wound on the spool.

* * * * *